Figure 1:
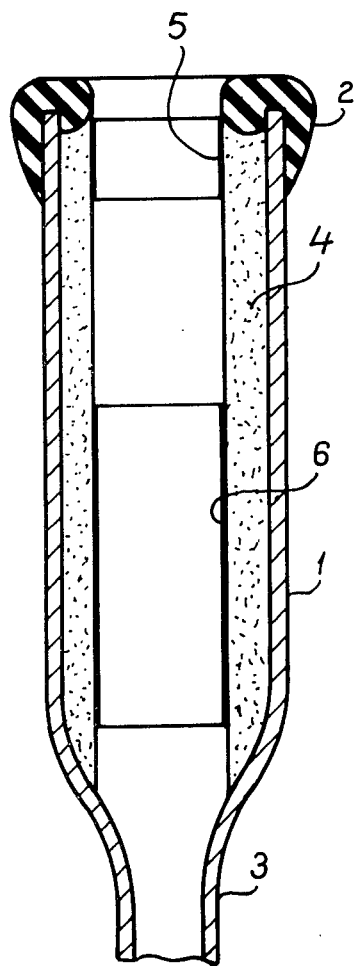

United States Patent [19]

Worstorff

[11] 3,934,550

[45] Jan. 27, 1976

[54] METHOD FOR MACHINE MILKING OF COWS

[75] Inventor: Hermann Heinrich Karl Worstorff, Tumba, Sweden

[73] Assignee: Alfa-Laval AB, Tumba, Sweden

[22] Filed: Mar. 14, 1974

[21] Appl. No.: 451,280

[52] U.S. Cl. ........ 119/14.02; 119/14.18; 119/14.43
[51] Int. Cl.² ............................................ A01J 5/06
[58] Field of Search ........... 119/14.02, 14.01, 14.18, 119/14.43, 14.47, 14.49, 14.54, 14.28

[56] References Cited
UNITED STATES PATENTS

| 875,802 | 1/1908 | Good | 119/14.47 |
| 942,243 | 12/1909 | Berberich | 119/14.02 |
| 1,308,053 | 7/1919 | Disbrow | 119/14.18 |
| 3,077,180 | 2/1963 | Hagg et al. | 119/14.54 X |
| 3,659,558 | 5/1972 | Noorlander | 119/14.49 X |

FOREIGN PATENTS OR APPLICATIONS

| 112,034 | 12/1917 | United Kingdom | 119/14.49 |

Primary Examiner—J. N. Eskovitz
Attorney, Agent, or Firm—Cyrus S. Hapgood

[57] ABSTRACT

Machine milking of the cow is effected by subjecting the teats of the udder continuously to a constant vacuum so as to extract the milk, the teats also being massaged by subjecting them to impulses in the form of pressure impulses and/or electric impulses with a frequency of about 5 to 50 Hz, preferably about 10 Hz. The teat cup comprises a resilient annular sealing head located at the upper end of a cylindrical rigid shell and adapted to lie against the teat base, and means within the shell for transmitting these impulses to the teat.

9 Claims, 4 Drawing Figures

METHOD FOR MACHINE MILKING OF COWS

This invention relates to a method for machine milking of cows, in which the teats of the udder with their gland openings are subjected continuously to a constant vacuum, so as to extract the milk, and also to impulses so as to effect a circulatory relieving (massage) of the teats. The invention also relates to a teat cup suitable for carrying out the method.

It is known that the present-day machine milking of cows is carried out according to the interval system, whereby the teats of the udder alternately are subjected to a suction stroke and a relieving stroke. In this case, the conventional inner space of the teat cup liner in each teat cup is permanently connected to a vacuum of a milk-discharging system, whereas the pulsation chamber between the teat cup liner and the teat cup shell is connected alternately to vacuum and atmospheric air during each pulsation stroke.

In these known milking machines, for reasons depending on the kind of milking system, the capacity of the vacuum generator, the cross section as well as the length of the pipelines, and the number of the milking units, there will be irregular variations of the milking vacuum, although these variations today can be almost completely avoided in principle. On the other hand, the magnitude of the cyclic variations caused by the pulsation of the milking vacuum is determined by the milk flow as well as by the diameter, length and tension of the teat cup liner and can amount, below the teats, to as much as 60 percent of the milking vacuum. These cyclic variations depend on the interval principle of present milking systems and lead, together with a back-flow of milk or milk droplets, to a transmission of udder-pathogen microorganisms, said back-flow being caused by the increase of the inner space of the teat cup liner each time when a relieving stroke is followed by a suction stroke.

An object of the present invention is to eliminate, in machine milking, cyclic variations of the vacuum below the teat and to attain a continuous milk extraction from the teats during the milking period. According to the invention, this object is achieved by a method in which the previously mentioned impulses for effecting a circulatory relieving of the teats are used in the form of pressure impulses and/or electric impulses with a frequency of about 5 Hz to about 50 Hz, preferably 10 Hz (Hz is the well-known unit of frequency, one cycle per second).

Consequently, the interval milking is abandoned and the gland openings of the teats remain connected to a constant vacuum during the entire milking time; and the impulses which act on the teats before the beginning of the milk flow will lead to a stimulation of the animal, so that the latter remains prepared to emit the milk continuously and rapidly. Further advantages of the new method are that there is no back-flow of the milk (no transmission of microorganisms to the teats), there are no traumatic injuries of the teats, and the stripping yield of milk can be recovered without manual help.

The electric current impulses give a corresponding heat development (electro-massage) in the teats and thereby generate the desired relieving of the teats.

According to tests of the present method, the magnitude of the cyclic variations below the teat amounts (independently of the milk flow) to less than 1/10 of the magnitude of the variations in the known milking systems. It is thus possible to reduce the usual milking vacuum of 0.50 kp/cm$^2$ or to accelerate the milk extraction. Furthermore, the transmission of the udder-pathogen microorganisms is reduced to a minimum, and the extraction of the milk takes place in such a manner that the stripping yield of milk can be effected by means of the machine, i.e., without manual action. Heretofore, such stripping has been an obstacle to economical milking.

It will be apparent that with the new method, pulsators and ducts necessary for their operation are eliminated. The claw in existing milking systems will now have for its object only to collect the milk and no longer to distribute the pulsation air. On the other hand, central vibration generators and means for transmitting vibrations to the teats are necessary. Said generators and means can be simple designs of an electric, electromagnetic, pneumatic or hydraulic kind, as will be explained presently.

Figure 2:
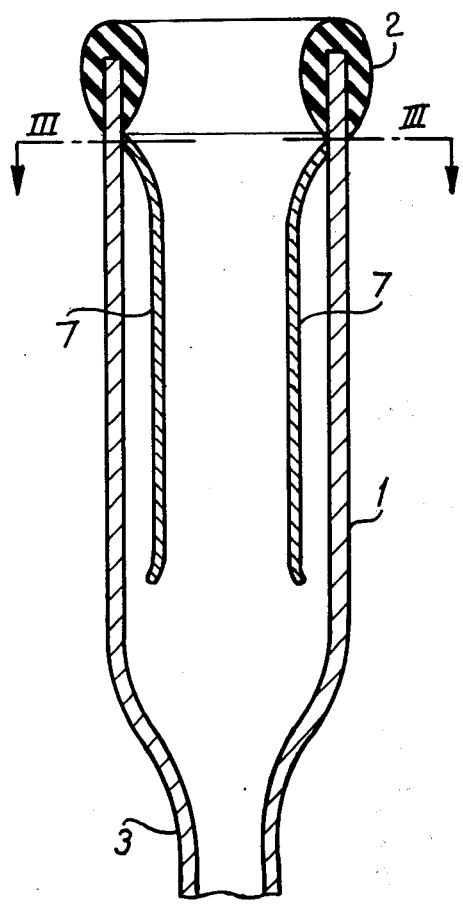
Figures 3, 4:
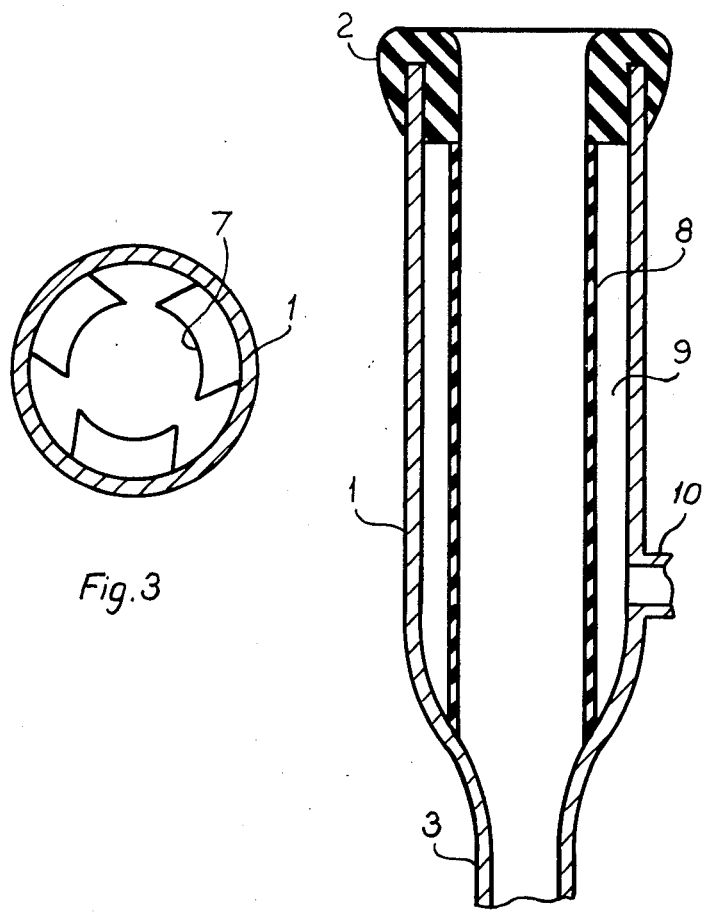

The invention is explained in more detail below in conjunction with the accompanying drawings, in which FIGS. 1, 2 and 4 are longitudinal sectional views of different embodiments of the new teat cup, and FIG. 3 is a cross section along the line III—III in FIG. 2.

In the different figures, corresponding details have the same reference numerals.

As already mentioned, an object of the invention is to eliminate cyclic vacuum variations below the teats in machine milking and, by means of the kind of the circulatory relieving (massage) of the teats, to effect a continuous milk extraction from the teats during the milking time.

To this end, the embodiment according to FIG. 1 comprises a rigid teat cup shell 1 provided at its upper end with a resilient, annular sealing head 2, which effects the sealing of the shell against the teat base and can be designed in any suitable manner. The inner space of the shell 1 is connected at its reduced lower end 3 to the constant vacuum of the milk-discharging system. A resilient, cylindrical foam plastic layer 4 with a smooth inner surface is joined in the shell 1 with the sealing ring 2. The layer 4 extends preferably along the whole inner length of the shell and is so resilient that it can adjust itself to the diameter of the teats. A cylindrical, yielding electrode 5 is provided at the upper part of the inside of the foam plastic layer 4, the inside of which is formed, for instance, of a thin film, or is provided at the sealing head 2; and a cylindrical yielding electrode 6 is provided at the lower part of the inside of the layer 4, the electrode 6 preferably having a greater length than the electrode 5. The cylindrical electrodes 5 and 6 may consist of electrically conducting plastic or rubber (impregnated with graphite or carbon black).

Teat cups of the kind shown in FIG. 1 are pushed onto the teats, while being connected to the vacuum of the milk-discharging system, until the sealing ring 2 of each teat cup lies against the base of the teat. A further upward climbing of the teat cup liner does not take place, contrary to the case in the known milking machines operating according to the interval method. The electrodes 5 and 6 are then connected to an electric impulse generator (not shown), which advantageously operates at a frequency of about 10 Hz, so that current impulses act directly on the teats and effect the circulatory relieving of the teat and also lead to a stimulation of the animal. The latter will then remain prepared to emit the milk continuously, the milk being extracted by means of the constant vacuum of the milk-discharging system connected to the lower end 3 of each teat cup shell 1.

In the embodiment according to FIGS. 2 and 3, the transmission of the vibrations to the teats, so as to effect circulatory relieving, takes place by mechanical means. To this end, resilient, springlike vibration arms 7 are fixed at their upper ends to points below the sealing ring 2 in the shell 1 and extend freely downwards. These arms, which engage against the teat, are brought into vibratory movement by means of a vibration generator (not shown), for example, electromagnetically. This vibratory movement is transmitted to the teat and leads again to said circulatory relieving. Also in this case, it is preferred to operate at a frequency of about 10 Hz, so as to put the milk gland and the teat area into resonance vibration.

In the embodiment according to FIG. 4, an inner cylindrical, resilient diaphragm 8, which is securely fastened at the top and at the bottom and forms an annular space 9 with the shell 1, joins with the sealing ring 2. This space 9 can be filled with air or a liquid and communicates, via a conduit 10, with a vibration generator (not shown) which puts air or the liquid into vibration. Thus, the diaphragm 8 is put into a vibration which is transmitted to the teat and consequently leads to a circulatory relieving of the teat, whose continuous milk emission is continuously discharged by means of the vacuum of the milk-discharging system.

Consequently, according to the invention it is possible to lead electric current impulses directly into the teats or to generate vibrations electrically and to lead them electromagnetically, pneumatically or hydraulically to the teats. It is also possible to generate the vibrations pneumatically or hydraulically and to transmit them pneumatically, hydraulically or mechanically to the teats.

As will be apparent from the foregoing, each of the teat cups, when applied to the cow, forms a milk flow passage leading from the corresponding teat to the source of constant vacuum via a region of minimum throughflow area defined by the reduced portion 3. Since the latter is formed by the rigid shell 1, the milk flow passage is maintained with a substantially constant minimum throughflow area while the high frequency massaging impulses are applied to the teat. In this way, the teats with their gland openings are subjected to a substantially constant vacuum while being subjected to these massaging impulses.

I claim:
1. A method for machine milking of cows, in which the teats of the udder with their gland openings are subjected continuously to a constant vacuum so as to extract the milk and are subjected to impulses so as to massage the teats, the method being characterized in that the impulses are in at least one of the forms selected from pressure impulses and electric impulses and have a frequency of about 5 Hz to about 50 Hz.

2. The method of claim 1, in which said frequency is about 10 Hz.

3. The method of claim 1, in which said impulses are electric and are transmitted directly to the teats by contacting the teats with electrodes.

4. The method of claim 1, in which the impulses are generated electrically and are transmitted to the teats electromagnetically.

5. The method of claim 1, in which the impulses are generated electrically and are transmitted to the teats pneumatically.

6. The method of claim 1, in which the impulses are generated electrically and are transmitted to the teats hydraulically.

7. The method of claim 1, in which the impulses are generated pneumatically.

8. The method of claim 1, in which the impulses are generated hydraulically.

9. A method of milking a cow with the use of teat cups applied to the cow's udder and each forming a milk flow passage from a corresponding teat to a source of constant vacuum, said method comprising the steps of subjecting the teats to massaging impulses having a high frequency of about 5 Hz to about 50 Hz while maintaining each said flow passage with a substantially constant minimum throughflow area, whereby the teats with their gland openings are subjected continuously to a substantially constant vacuum while being subjected to said massaging impulses.

* * * * *